United States Patent [19]

McPherson

[11] Patent Number: 4,708,496
[45] Date of Patent: Nov. 24, 1987

[54] DIAMOND BEARING AND MANUFACTURE THEREOF

[75] Inventor: James N. McPherson, Orange, Calif.

[73] Assignee: Smith International, Inc., Newport Beach, Calif.

[21] Appl. No.: 865,159

[22] Filed: May 20, 1986

[51] Int. Cl.⁴ .................. F16C 17/04; F16C 43/02; B21D 39/04
[52] U.S. Cl. .................... 384/303; 384/420; 384/95; 228/122; 228/138; 29/149.5 R
[58] Field of Search ............... 384/92, 95, 285, 303, 384/420, 425, 907, 912, 282; 175/371, 107, 104, 105, 410; 29/149.5 R; 228/122, 135, 138, 185, 189

[56] References Cited

U.S. PATENT DOCUMENTS

| T102,901 | 4/1983 | Offenbacher | 29/149.5 R |
| 4,083,612 | 4/1978 | Olson | 384/425 |
| 4,190,301 | 2/1980 | Lachonius et al. | 384/95 |
| 4,345,798 | 8/1982 | Cortes | 384/907.1 X |
| 4,410,054 | 10/1983 | Nagel et al. | 175/107 |
| 4,451,162 | 5/1984 | Shepherd | 384/95 |
| 4,468,138 | 8/1984 | Nagel | 384/303 |
| 4,549,820 | 10/1985 | Mullins | 384/95 |
| 4,620,601 | 11/1986 | Nagel | 384/303 X |

FOREIGN PATENT DOCUMENTS 2054064A 4/1973 United Kingdom .

Primary Examiner—Stuart S. Levy
Assistant Examiner—David Werner
Attorney, Agent, or Firm—Price, Gess & Ubell

[57] ABSTRACT

A structure and method for attaching bearing inserts including a bearing ring having through holes therein into which said inserts are press fitted and an underlying brazing ring, which, when heated, attaches the bearing inserts to the bearing ring and the bearing ring and inserts to an adjoining structural member.

20 Claims, 11 Drawing Figures 4,708,496

DIAMOND BEARING AND MANUFACTURE THEREOF

BACKGROUND OF THE DISCLOSURE

The subject invention relates to bearings and more particularly to a diamond thrust bearing such as is employed for example in the downhole drilling art. The invention provides a bearing exhibiting significant improvement in load carrying capability and manufacturing efficiency.

In the prior art, thrust bearings are known which employ bearing inserts comprising hardmetal or carbide studs having planar, polycrystalline diamond faces. Bearings employing such inserts have provided a useful, but still limited, load carrying ability.

In manufacture, such diamond faced bearing inserts have been inserted into wells machined into associated bearing races and brazed into place. This procedure has the disadvantage that the wells must all be drilled to the same precise depth, in order to insure that the planar diamond bearing faces all lie in a common plane in the finished product.

Another drawback of the prior art approach is that replacement of worn or damaged bearing inserts is difficult. The structural member into which the bearing inserts are inserted may be very expensive. It may, for example, carry a radial bearing comprised of a tungsten carbide matrix. If the bearing inserts become worn, it may be impossible to replace them without destroying the utility of the associated structural member. Damage to the associated structural member may occur, for example, through structural deformation when heat is applied to loosen brazing material originally used to bond the bearing inserts into their associated recesses. Such damage may be particularly undesirable where the structure is a unitary bearing sleeve having diamond faced thrust bearings and a radial matrix bearing.

SUMMARY OF THE INVENTION

It is therefore an object of the invention to provide an improved bearing structure.

It is another object of the invention to provide an improved method of fixing bearing inserts to a sleeve or other support structure.

It is another object of the invention to eliminate the necessity to drill holes of a precisely machined depth in order to fix bearing inserts in place.

It is another object of the invention to provide a bearing structure which facilitates replacement of bearing inserts, while minimizing deformation of associated parts.

It is a still further and major object of the invention to significantly improve the load carrying ability of a thrust bearing employing diamond faced studs or inserts.

These and other objects and advantages are achieved according to the invention by constructing a generally flat retainer having holes therein for receiving press-fitted bearing inserts. The holes pass entirely through the retainer, eliminating the necessity to create wells of a precisely drilled depth. The retainer and press-fitted bearing inserts form a subassembly which is attached to the surface of an associated structural member.

The bearing inserts themselves are provided with fluid flow channels across their faces. Such flow channels have yielded unusual results in the form of a dramatic increase in the load carrying ability of the thrust bearing.

In a preferred embodiment, the retainer comprises a flat ring having an array of holes into which bearing inserts are press-fitted. A brazing washer is placed between the ring and a bearing race surface. Upon heating, the brazing material is drawn up and around the press-fitted bearing inserts by capillary action, thus permitting a one step attachment of the inserts to both the ring and the race.

In addition to the one-step attachment feature, an additional advantage of the invention is that the size of the studs carrying the poly crystalline diamond bearing surface may be cut in size by about one-half, resulting in about a 40% cost savings in the cost of the inserts. Another advantage is that the ring and press-fit elements may be manufactured as a subassembly, which considerably simplifies manufacturing and further reduces cost. More accurate alignment of the planar diamond faces also is attainable.

BRIEF DESCRIPTION OF THE DRAWINGS

The just-summarized invention will now be described in detail in conjunction with the drawings of which.

DETAILED DESCRIPTION OF THE PREFERRED EMBODIMENT

Figure 1:
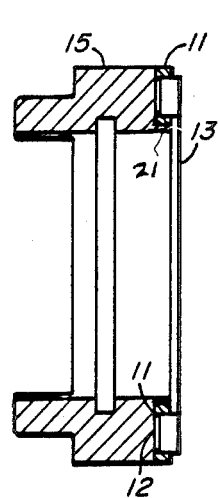
FIG. 1 is a crossectional drawing illustrating the preferred embodiment of the invention.
Figure 2:
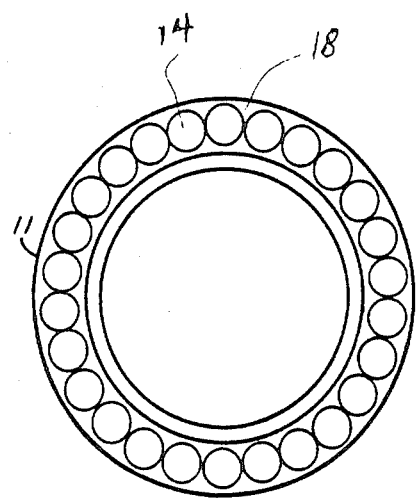
FIG. 2 is a view of one end of the bearing of the preferred embodiment.
Figure 3:
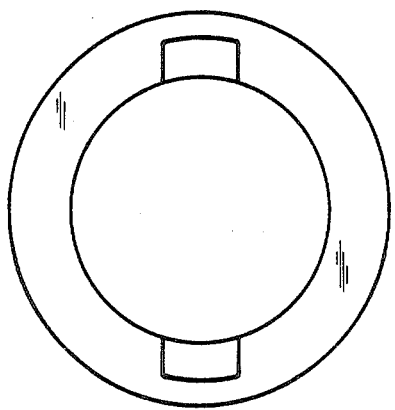
FIG. 3 is a view of the opposite end of the preferred embodiment.

A crossection of a bearing according to a preferred embodiment of the invention is shown in FIGS. 1-3. The bearing includes an annular ring 11, having a number of bearing inserts or "buttons" 13 press fitted into holes 14 in the ring. The inserts 13 are preferably tungsten carbide studs having a polycrystalline diamond surface layer. The inserts 13 are appropriately spaced facilitating the flow of cooling fluid.

Figure 4:
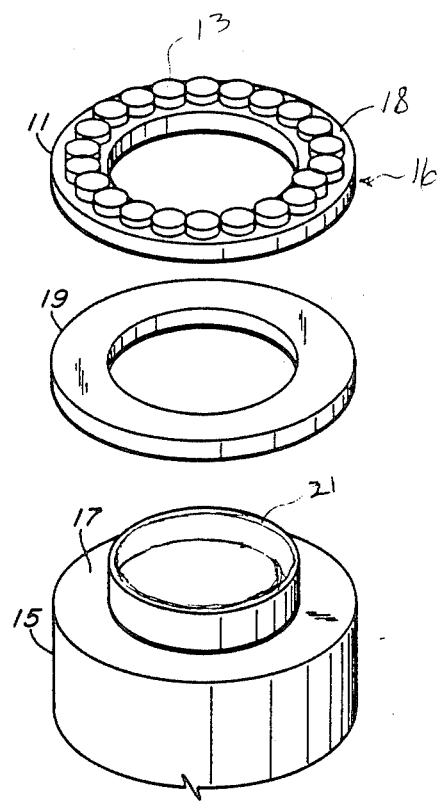
FIG. 4 is a perspective view of the preferred embodiment.

The tolerance of the holes 14 is 0.0005 inches, to facilitate press-fitting of the inserts 11 into the ring. The ring 13 and press-fitted inserts 11 comprise a subassembly 16, shown in FIG. 4.

The subassembly 16 is rigidly attached on a race 17 of a bearing support member 15. Such subassemblies 16 may be manufactured in a desired quantity and stored for use, for example, when it is desired to refurbish apparatus returned from the field. The bearing support member 15 includes an annular guide extension 21 for registration of the subassembly.

To manufacture a complete bearing structure, a brazing ring 19 (FIG. 4) is placed on the race 17. A subassembly 16 is then placed on the brazing ring 19. The support member 15, subassembly 16, and brazing ring 19 are then heated, for example by induction heating, to an appropriate brazing temperature, of approximately e.g. 1200° F. When the brazing ring 19 melts, capillary action occurs causing the brazing material to rise up around the inserts 13 and thereby attach them to the ring concurrently with the attachment of the ring 11 and inserts 13 to the race 17. This process is faciliated by the different coefficients of expansion of the steel ring 11 and tungsten carbide inserts 13.

If it is desired to refurbish the bearing, for example, upon return from the field, the structure may simply be reheated and the subassembly 16 removed. A new subassembly 16 may then be brazed into place. According to this method, valuable supporting structures to which the subassembly 16 has been attached may be preserved and recycled.

Figure 5:
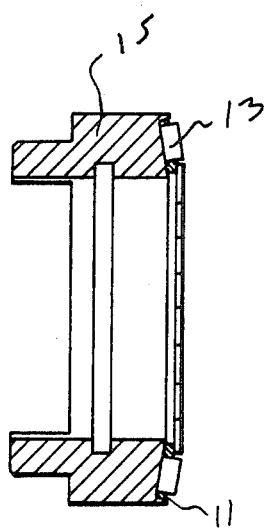
FIG. 5 is a crossectional drawing of an alternate embodiment.
Figure 6:
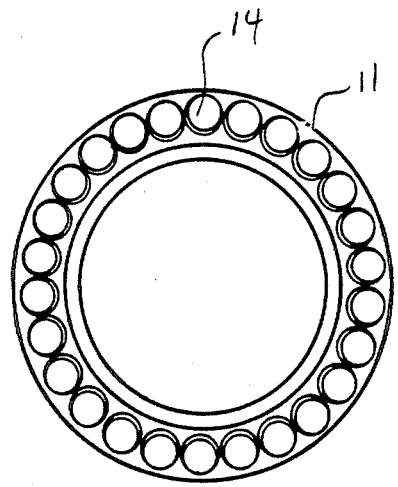
FIG. 6 is a view of one end of the embodiment of FIG. 5.
Figure 7:
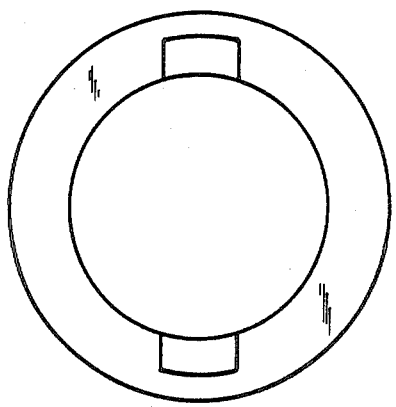
FIG. 7 is a view of the opposite end of the embodiment of FIG. 5.

FIGS. 5–7 illustrate an alternate embodiment of the invention. In this embodiment, the ring 11 has been uniformly bent around its circumference to dispose the bearing inserts 13 at an angle to the centerline of the generally cylindrical support member 15. Such a bend may be imparted to a flat ring, for example, by use of a standard press. The angled inserts 13 provide a bearing which accomodates both thrust and radial forces.

Figure 9:
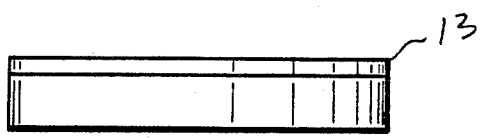
FIGS. 8 and 9 illustrate a prior art stud vs. the button insert of the preferred embodiment.
Figure 8:
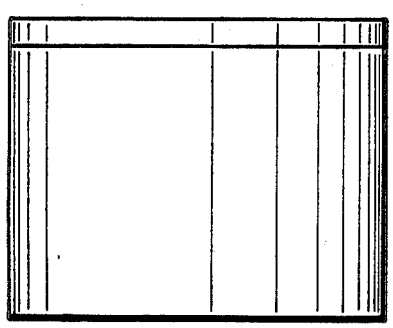

FIGS. 8 and 9 illustrate the relative size reduction in the bearing inserts or "studs" which may be realized by use of the ring subassembly according to the invention rather than the prior art approach of drilling non-through holes to accomodate studs such as those shown in FIG. 8. The prior art technique requires the longer stud of FIG. 8 to gain proper support from the surrounding steel.

The surface 18 of the ring 11 surrounding the inserts 13 may be coated with a wear resistant substance to reduce wear caused by drilling fluids in a downhole drilling environment. One such material is tungsten carbide. Such coating is facilitated by the subassembly structure of the invention because the coating can be applied before or after the joining process.

Figure 10:
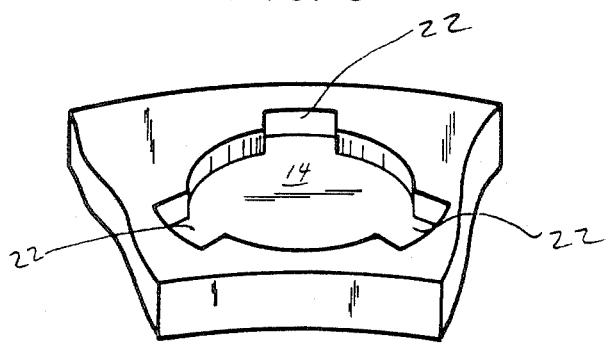
FIG. 10 illustrates an alternate hole structure.

FIG. 10 illustrates an alternate structure for the holes 14. This structure employs recessed areas 22. Such areas 22 could accomodate brazing material, for example in an embodiment wherein capillary action was not sufficient to achieve proper brazing of the button inserts 13.

Figure 11:
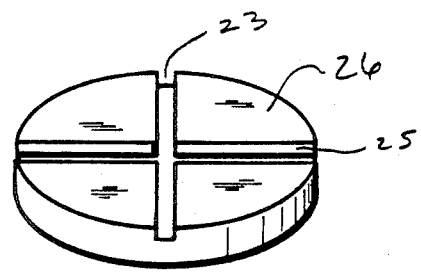
FIG. 11 illustrates an improved bearing insert.

FIG. 11 illustrates an improved bearing insert 13 wherein cross channels 23, 25 have been scribed into the diamond bearing surface 26, for example by the preferred mode of EDM (electron discharge machining). These channels 23, 25 increase fluid flow and attendant cooling across the bearing surface, resulting in a suprising and significant increase in the load carrying ability of the bearing surface without failure.

The channels 23, 25 are preferably one-thirty second of an inch wide by one-thirty second of an inch deep. It is also preferred that the inserts' bearing surface 26 extend about one thirty second to one sixteenth of an inch above the support ring 11. This spacing creates optimum fluid flow around the inserts 13. It is preferred that the space between the inserts 11 is such as to provide a velocity of fluid flow be in the range of fifty to one hundred feet per second. This range provides the maximum rate of cooling without erosion of the bearing support structure.

It may be observed that a single fluid flow channel, e.g. 23, can provide significant improved performance, believed to result from elimination of a dead zone in the cooling fluid flow pattern about the inserts 13. The cross channels 23, 25 provide even better performance.

As will be apparent to those skilled in the art the just described preferred embodiment is subject to numerous adaptations and modifications without departing from the scope and spirit of the invention. Therefore, it is to be understood that, within the scope of the appended claims, the invention may be practiced other than as specifically described herein.

What is claimed is:

1. A bearing structure comprising:
 a support member having a race;
 a generally planer retainer ring having a number of holes therein;
 a plurality of bearing inserts, one insert mounted in each of said holes; and
 brazing material attaching said ring and said inserts to said race and attaching said inserts to said ring.

2. The bearing structure of claim 1 wherein said ring is fabricated of steel.

3. The bearing structure of claim 2 wherein said holes are circular in crossection and wherein said inserts comprise cylindrical inserts having a diamond wear surface.

4. The bearing structure of claim 3 wherein said ring includes an erosion protective coating.

5. The bearing structure of claim 4 wherein said erosion protective coating comprises a hard metal.

6. The bearing structure of claim 5 wherein said erosion protective coating comprises tungsten carbide.

7. The bearing structure of claim 4 wherein said ring and said inserts are removable, thereby enabling reworking and reassembling of said ring to said race or to a new race.

8. A method of fabricating a bearing structure comprising:
 fabricating an annular ring having a plurality of through holes disposed around its circumference;
 press-fitting a bearing insert into each said hole to form a subassembly;
 placing brazing material on a bearing race;
 placing said subassembly onto said race; and
 heating said brazing material to simultaneously braze said annular ring and bearing inserts into place on said race.

9. The method of claim 8 wherein, after said step of heating, said brazing material bonds said inserts to both said ring and said race.

10. The method of claim 9 wherein said brazing material comprises an annular brazing ring.

11. The method of claim 8 wherein, during said step of heating, said brazing material is drawn up and around said inserts by capillary action.

12. The method of claim 8 wherein said bearing race includes a guide extension and said subassembly is mounted on said guide extension prior to said heating step.

13. A bearing structure comprising:
 a support member having a race;
 a generally planar retainer ring having a number of through holes therein;
 a plurality of bearing inserts, one insert mounted in each of said holes; and
 a brazing mass cohesively bonding together said inserts, said race and said ring.

14. The bearing structure of claim 13 wherein said ring is fabricated of steel.

15. The bearing structure of claim 14 wherein said holes are circular in crossection and wherein said inserts comprise cylindrical inserts having a diamond wear surface.

16. The bearing structure of claim 15 wherein said ring includes an erosion protective coating.

17. The bearing structure of claim 16 wherein said erosion protective coating comprises a hard metal.

18. The bearing structure of claim 17 wherein said erosion protective coating comprises tungsten carbide.

19. The bearing structure of claim 18 wherein said ring and said inserts are removable, thereby enabling reworking and reassembling of said ring to said race or to a new race.

20. The bearing structure of claim 13 wherein said support member provides a guide extension having a cylindrical outer surface and wherein said retaining ring is mounted on said guide extension.

* * * * *